(12) United States Patent
Okada et al.

(10) Patent No.: US 6,236,790 B1
(45) Date of Patent: May 22, 2001

(54) OPTICAL-FIBER CABLE AND METHOD OF MANUFACTURING THE SAME

(75) Inventors: Naoki Okada; Hirohito Watanabe, both of Yotsukaido; Matsuhiro Miyamoto, Sakura; Yoshiyasu Sato, Chiba; Koichiro Watanabe, Tomisato-machi; Hideyuki Iwata, Tokyo, all of (JP)

(73) Assignees: Fujikura Ltd.; Nippon Telegraph and Telephone Corporation, both of Tokyo (JP)

( * ) Notice: Subject to any disclaimer, the term of this patent is extended or adjusted under 35 U.S.C. 154(b) by 0 days.

(21) Appl. No.: 09/276,494

(22) Filed: Mar. 25, 1999

(30) Foreign Application Priority Data

| Mar. 25, 1998 | (JP) | 10-078053 |
| Oct. 29, 1998 | (JP) | 10-309202 |
| Oct. 29, 1998 | (JP) | 10-309207 |
| Feb. 17, 1999 | (JP) | 11-039245 |

(51) Int. Cl.$^7$ .................................................. G02B 6/44
(52) U.S. Cl. ........................ 385/102; 385/103; 385/106; 385/100
(58) Field of Search ................................. 385/100–114

(56) References Cited

U.S. PATENT DOCUMENTS

5,131,064 * 7/1992 Arroyo et al. ...................... 385/102
5,509,097 * 4/1996 Tondi-Resta et al. .............. 385/113

* cited by examiner

*Primary Examiner*—Phan T. H. Palmer
(74) *Attorney, Agent, or Firm*—Oblon, Spivak, McClelland, Maier & Neustadt, P.C.

(57) ABSTRACT

There is provided an optical-fiber; and a cylinder body which is made from a cylindrically formed belt-shaped material and made of resin and which accommodates the optical-fiber therein.

10 Claims, 5 Drawing Sheets

OPTICAL-FIBER CABLE AND METHOD OF MANUFACTURING THE SAME

BACKGROUND OF THE INVENTION

1. Field of the Invention

The present invention relates to an optical-fiber cable having a cylinder body disposed at the center, with optical-fibers being accommodated in the cylinder body, and relates, more particularly, to an optical-fiber cable which can be manufactured easily at low cost by forming a belt-shaped material into a cylinder shape to form a cylinder body.

2. Description of Related Art

There have been known 1) a slot type cable, 2) a loose tube type cable and 3) a center tube type cable, for example, as structures of an optical-fiber cable for assembling several tens to several hundreds of optical-fibers together.

According to the slot type cable, optical-fiber ribbons are accommodated within grooves that is formed on the outer peripheral surface of a rod, and a pressed-wound layer and a sheath are formed sequentially on the periphery of the slotted rod. A tension member is disposed at the center of the slotted rod, with a rip cord disposed between the pressed-wound layer and the sheath.

According to the loose tube type cable, loose tubes accommodating optical fibers are stranded around central tension members, and a pressed-wound layer and a sheath are formed sequentially on this assembly. Jelly is filled within the loose tubes, and rip cords are distributed between the pressed-wound layer and the sheath.

According to the center tube type cable, there is disposed, at the center, a center tube accommodating optical-fiber ribbons therein, and a sheath is formed on the periphery. Tension members are embedded within the sheath, and jelly is filled within the center tube. Further, rip cords are disposed between the center tube and the sheath.

These optical-fiber cables have had the following problems.

The slot type cable has a suitable structure for obtaining a multiple-core optical-fiber cable as the optical-fibers are accommodated in the spiral grooves formed on the outer periphery of the rod. However, the slot type cable has a problem that its structure becomes costly in the case of a small-core optical-fiber cable due to high cost of the slotted rod.

The loose tube type cable has a suitable structure for obtaining a small-core optical-fiber cable by using single-core optical-fibers. However, the loose type cable has a problem of having a larger number of manufacturing processes because this structure requires a process of forming loose tubes and a process of assembling a plurality of loose tubes around a central tension member. Further, in the case of structuring a multiple-core optical-fiber cable by using optical-fiber ribbons, this has a problem that an external diameter becomes larger. Furthermore, as the loose tubes are manufactured by a method of forming a tube by extruding a resin while inserting optical-fibers at the same time, it has been unavoidable to charge jelly into the whole inside of the loose tubes in order to prevent a molten resin from adhering to the optical-fibers at the time of forming by extrusion. Accordingly, this has an inconvenience of incurring the cost of charging the jelly.

The center tube type cable can be manufactured in a relatively small number of processes because of its simple structure. However, the center tube is formed by extrusion while inserting optical-fibers and optical-fiber ribbons at the same time, as in the case of the loose tube type cable. Therefore, it has been unavoidable to charge jelly into the tubes in order to prevent a move of the optical-fiber ribbons in a longitudinal direction within the center tube. This has a problem of high manufacturing cost.

Moreover, both the loose tube type cable and the center tube type cable have had a problem that the tube has to be disconnected at the time of carrying out a connection such as a branch connection or the like.

SUMMARY OF THE INVENTION

It is an object of the present invention to provide an optical-fiber cable capable of being manufactured at lower cost than by the conventional method, and to provide a method of manufacturing this optical-fiber.

It is another object of the present invention to provide an optical-fiber cable that facilitates a connection such as a branch connection, and to provide a method of manufacturing this optical-fiber cable.

According to a first aspect of the present invention, there is provided an optical-fiber cable which comprises an optical-fiber; and a cylinder body which is made from a cylindrically formed belt-shaped material and made of resin and which accommodates the optical-fiber therein.

The optical-fiber includes a fiber ribbon type which has plural fibers and a single-fiber type.

Preferably, the optical-fiber cable further comprises a first tension member which is disposed at an outside of the cylinder body; and a sheath which covers the outside of the cylinder body and the tension member.

Preferably, the optical-fiber cable further comprises: a filler which is disposed with a distance along the optical-fiber in a longitudinal direction thereof and which is provided between the optical-fiber and the cylinder body for preventing a move of the optical-fiber in a longitudinal direction.

Preferably, the belt-shaped material has a first end and a second end, and an adhesive member is adhered to the first end and the second of the cylindrically-formed belt-shaped material.

Preferably, the adhesive member has a tension member therein.

Preferably, the optical-fiber cable further comprises: a first rip cord which is disposed at the outside of the cylinder body within the sheath.

Preferably, the optical-fiber cable further comprises: a second rip cord; and a second tension member. The first rip cord and the second rip cord are symmetric with respect to the optical-fiber. The first tension member and the second tension member are symmetric with respect to the optical-fiber. A first plane which includes the first rip cord and the second rip cord and a second plane which includes the tension first member and the second tension member cross each other.

Preferably, the rip cord has one of a high-tensile high-polymer fiber, a glass fiber, a cotton yarn and a metal wire.

According to a second aspect of the present invention, there is provided a method of manufacturing an optical-fiber cable, comprising the steps of: accommodating a optical-fiber in a cylinder body while forming a belt-shaped material into the cylinder body; disposing a tension member at an outside of the cylinder body; and covering the outside of the cylinder body and the tension member with a sheath.

Preferably, before forming the belt-shaped material into the cylinder body, the belt-shaped material is disposed along the optical-fiber, and a filler is applied with a distance along to one of the belt-shaped material and the optical-fiber in a longitudinal direction.

Preferably, an adhesive member is adhered to a first end and a second end of the cylindrically formed belt-shaped material.

DESCRIPTION OF THE PREFERRED EMBODIMENTS

First Embodiment

Figure 1:
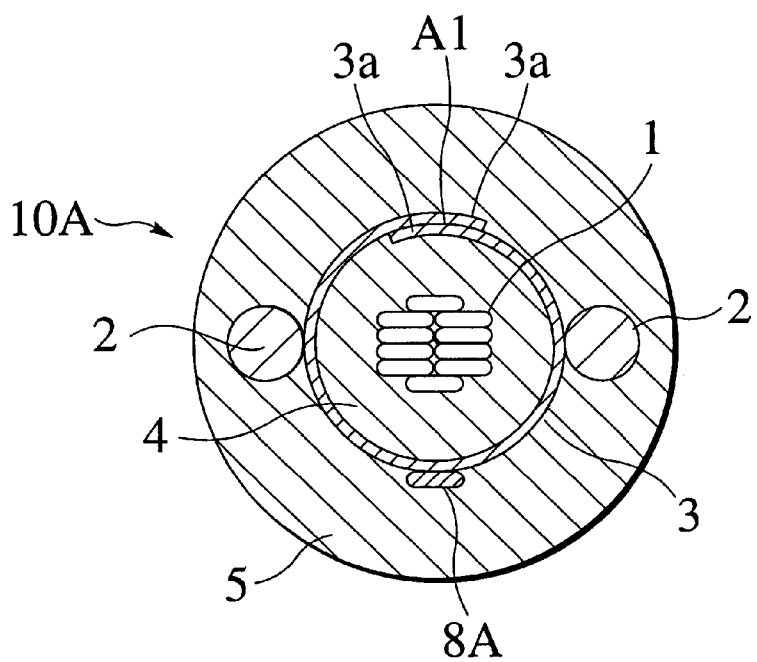
FIG. 1 is a cross sectional view of an optical-fiber cable relating to a first embodiment of the present invention.

There will be explained the present invention in detail below. FIG. 1 shows the first embodiment of an optical-fiber cable of the present invention. A plurality of optical-fiber ribbons 1 as an optical-fiber are accommodated inside a cylinder body 3, and a filler 4 is filled between the optical-fiber ribbons 1 and the internal wall of the cylinder body 3.

Each of the optical-fiber ribbons 1 is structured by, for example, a four-fiber ribbon with a thickness of 0.3 mm and a width of 1.1 mm, including an optical fiber with a diameter of 0.250 mm, coated with an UV-curable resin (two-layer coated) for protecting the bare-fiber of a diameter of 0.125 mm and an UV-curable coloring resin for identification.

In the present embodiment, ten ribbons 1 are stacked. The number of the fiber ribbons 1 however, is not limited.

The cylinder body 3 is structured by a belt-shaped material formed in a cylindrical shape. On the outer periphery of the cylinder body 3, a joint part A1 is formed by joining both edges (ends) 3a of the belt-shaped material, along a longitudinal direction. A non-woven fabric tape or a plastic tape, for example, is used for the belt-shaped material to be used for forming the cylinder body 3. To the cylinder body 3, there may be applied a water-absorptive tape coated with a water-absorptive material, to provide the cylinder body 3 with waterproofing.

The filler 4 is not being filled continuously along the longitudinal direction of the cylinder body 3, but is being filled intermittently with a distance. For the filler 4, there is most suitably used a hot-melt type resin having a characteristic that this material is melted when heated and is solidified in a solid state at a room temperature. For example, there may used a polyethylene resin, a styrene elastomer, a rubber resin, or the like.

Two tension members 2 are disposed on the outer periphery (outside) of the cylinder 3 along a longitudinal direction of the cylinder body 3. These tension members 2 can be structured by a suitable tensile stress-resistant material. For example, there will be preferably used a steel wire, a glass fiber reinforced resin, an aramid fiber (Kebler; a trade mark) reinforced resin, or the like.

A sheath 5 collectively covers the cylinder body 3 and the tension member 2. The sheath 5 is formed by extrusion to cover these members with a suitable resin material. For example, polyethylene (PE) is used for this purpose.

Further, a rip cord 8A is disposed between the cylinder body 3 and the sheath 5 along a longitudinal direction of the cylinder body 3. For this rip cord 8A, there is used, for example, an aramid fiber, a high-tensile high-polymer fiber of a polyethylene terephthalate fiber, Tetron fiber, a glass fiber, a metal fiber, a cotton yarn, a plastic tensile stress-resistant unit, a steel wire, an aluminum wire, a copper metal wire, or the like. There is preferably used an aramid fiber, a polyethylene terephthalate fiber or a cotton yarn.

Figure 2:
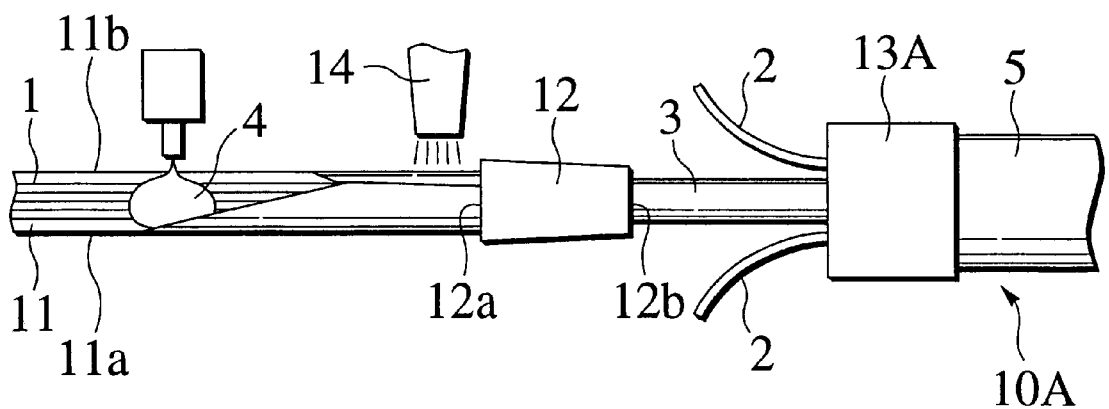
FIG. 2 is an explanatory view for showing a manufacturing process of the optical-fiber shown in FIG. 1.

An optical-fiber 10A of the above-described structure is manufactured as follows, for example. FIG. 2 is an explanatory view for showing a method of manufacturing the optical-fiber cable of the present invention.

An adhesive is coated in advance on one or both of edges (ends) 11a and 11b of a belt-shaped material 11, to form an adhesive layer (not shown). This adhesive layer is formed on a joint surface where both ends of the belt-shaped material 11 are put on each other when the belt-shaped material 11 is formed in a cylindrical shape in the later process.

Then, as shown in FIG. 2, a plurality of optical-fiber ribbons 1 are disposed on the belt-shaped material 11 in parallel with the belt-shaped materials 11. In this case, the belt-shaped material 11 and the fiber ribbons 1 may be in contact with each other or may be separated.

Next, a filler 4 is applied to the belt-shaped material 11 and the optical-fiber ribbons 1 intermittently with a distance in a longitudinal direction. In this case, it is necessary to prepare the filler 4 by at least the quantity which is sufficient to fix the optical-fiber ribbons 1 to the inner wall of the cylinder body 3 when the belt-shaped material 11 has been formed on the cylinder body 3 in the later process. Further, it is desirable, from the viewpoint of the waterproof function of the optical-fiber cable 10A, to obtain a quantity of the filler which is sufficient to fill completely the whole gap between the inner wall of the cylinder body 3 and the optical-fiber ribbons 1, if possible.

Next, the adhesive layer of both edges (ends) 11a and 11b (3a in FIG. 1) of the belt-shaped material is heated by heating means 14 such as a hot jet. Then, the adhesive of the adhesive layer is melted.

Next, the belt-shaped material 11 and the fiber ribbons 1 are guided into a former 12. The former 12 is formed in a conical tube shape, with its diameter being gradually reduced from an input part 12a, from which the belt-shaped material 11 and the fiber ribbons 1 are input, toward an exit part 12b. The belt-shaped material 11 is bent to surround the fiber ribbons 1 as they are passed through the former 12, and both edges (ends) 11a and 11b of the belt-shaped material 11 are overlapped to form a cylinder body 3. In this case, the adhesive is cooled, both ends 11a and 11b are adhered together, and a joint part A1 is formed.

Subsequently, in a state that two tension members 2 and a rip cord 8A (not shown) are set along the outside of the cylinder body 3 with the joint part A1 in the joined state, they are guided together into an extrusion molder 13A. By passing them through the extrusion molder 13A, the outer periphery of the tension members 2 and the rip cord 8A are covered together with the resin, thereby to form a sheath 5. Thus, a cable 10A is obtained.

According to the present embodiment, there are a small number of manufacturing processes since at the same time when the belt-shaped material 11 is formed into a cylinder shape, the fiber ribbons 1 are accommodated inside this cylinder, in manufacturing the optical-fiber cable 10A. Therefore, the optical-fiber cable 10A can be manufactured easily at low cost.

Further, since the process of forming the cylinder body 3, the process of accommodating the optical-fiber ribbons 1 inside this cylinder body 3 and the process of forming the sheath by collective covering, are carried out continuously, high manufacturing efficiency can be obtained.

Further, since the cylinder body 3 is formed by using the belt-shaped material 11, it is not necessary to form a tube by extrusion for accommodating the fiber ribbons 1, unlike the prior-art technique. Accordingly, the optical-fiber cable 10A can be manufactured at low cost, with a simple work for connection of the optical-fiber cable and a branching at a later stage.

Since the fiber ribbons 1 are fixed to the inner wall of the cylinder body 3 with the filler 4, it is possible to prevent the fiber ribbons 1 from being moved in a longitudinal direction within the cylinder 3. Further, as the filler 4 is filled intermittently without involving the filling of jelly, the work for connecting the optical-fiber cable is simple, with a satisfactory handling. The distance between the filling points of the filler is different depending on the diameter of the cable and the number of optical-fiber ribbons accommodated. However, if the distance between the filling points is too large, it is not possible to obtain the effect of preventing the move of the optical-fiber in a longitudinal direction on the waterproofing effect. On the other hand, if the distance between the filling of the filler is too small, it becomes costly, with poor work efficiency of branch connection. Therefore, usually, the filler is filled with a distance of about 0.2 to 2 m, preferably within a range of from 0.5 to 1 m. If the filler 4 is embedded into the gap between the inner wall of the cylinder body 3 and the fiber ribbons 1, this arrangement is desirable from the viewpoint of the waterproofing function as water invaded into the cylinder body 3 can be prevented from flowing through the whole inside of the cylinder body 3.

Further, at the time of branching at a later stage, the joint part A1 of the cylinder body 3 is peeled off and both ends 3a are separated in mutually opposite directions, so that the fiber ribbons 1 are taken out easily.

In the above embodiment, although the adhesive layer is provided in advance on both edges (ends) 11a and 11b of the belt-shaped material 11, it is also good to arrange such that, without providing the adhesive layer on the belt-shaped material 11 in advance, a suitable quantity of an adhesive is flown into the joint part A1 at the same time of forming the cylinder body 3 or after the forming of the cylinder body 3, and this may be hardened. Alternately, it may be arranged such that, without using an adhesive, the belt-shaped material 11 is formed in a belt shape, and thereafter, a yarn-shaped or tape-shaped material is wound around this belt.

Although the joint part A1 is formed by overlapping both edges (ends) 11a and 11b (3a in FIG. 1) of the belt-shaped material 11 in the above embodiment, the joint part may also be formed by facing both end surfaces of the belt-shaped material 11 together. In the case of winding a yarn-shaped or tape-shaped material without using an adhesive, it is not always necessary to form the joint part, but there may exist a gap between both edges (ends) 11a and 11b of the belt-shaped material 11.

Further, in the above embodiment, although explanation has been made of the case where a plurality of fiber ribbons 1 are accommodated with the cylinder body 3, there may also be accommodated a single-core optical-fiber.

Further, in the above embodiment, the filler is provided intermittently for preventing the move of the optical-fiber ribbons in a longitudinal direction. However, jelly may also be used instead of the filler if this permits cost allowance.

Second Embodiment

Figure 3:
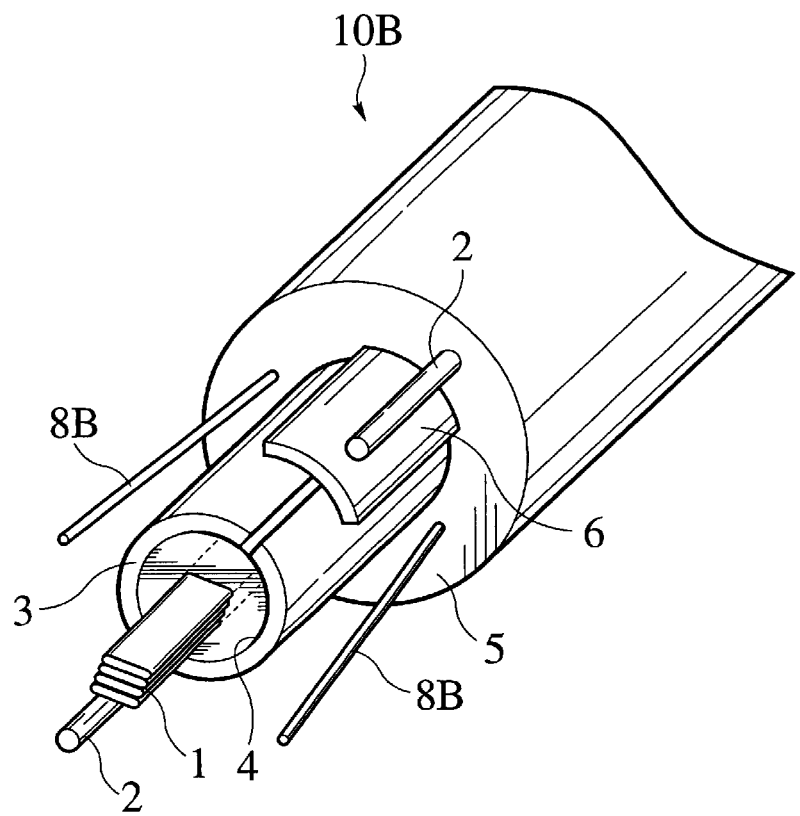
FIG. 3 is a perspective view of an optical-fiber cable relating to a second embodiment of the present invention.
Figure 4:
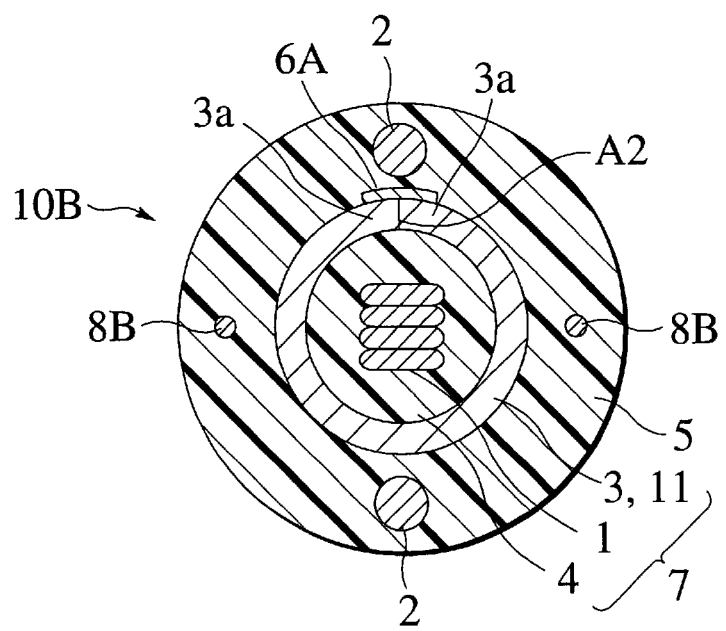
FIG. 4 is a cross sectional view of the optical-fiber cable shown in FIG. 3.

As shown in FIG. 3 and FIG. 4, an optical-fiber cable 10B has such a structure that a cylinder body 3 accommodating four optical-fiber ribbons 1 therein is disposed at the center, the outer periphery of the cylinder body 3 is covered with a sheath 5, and two rip cords 8B and two tension members 2 are embedded within the sheath 5. The cylinder body 3 is formed by joining both ends 3a of a belt-shaped material 11 in a width direction with an adhesive tape 6A to form a cylinder shape.

The same members as those in the first embodiment will hereinafter be attached with the same reference numbers, with their explanation being omitted.

Preferably, both ends 3a of the cylinder body 3 (belt-shaped material) are formed in a joint part A2, by facing both end surfaces of the belt-shaped material 11 together to be joined as shown in FIG. 4, or by facing both end surfaces with a slight gap left therebetween. Further, if both ends are joined satisfactorily with the adhesive tape 6A, there may be left a slight overlap portion at both ends 3a. However, if the overlap of both ends is too large, it becomes difficult to take out the fiber ribbons 1 from inside the cylinder body 3 at the time of branching at a later stage. Therefore, it is preferable that the size of the overlap is as small as possible.

Figure 5:
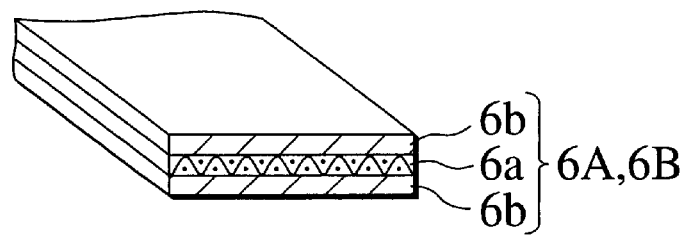
FIG. 5 is a perspective view for showing an adhesive tape shown in FIG. 3.

For the adhesive tape 6A, there are used, for example, adhesive layers 6b laminated on both surfaces of a tape material 6a, as shown in FIG. 5. The tape material 6a is prepared by, for example, a plastic tape made of polyethylene terephthalate (PET), polypropylene (PP), or the like or a non-woven fabric tape. The adhesive layer 6b is a hot-melt type made of ethylene-vinyl acetate copolymer (EVA), for example.

It is necessary that the adhesive tape 6A has adhesive strength at least on the surface to be brought into contact with the cylinder body 3. It is more preferable to have adhesive strength on both surfaces, for improved adhesion with the sheath 5, which ensures the joint of both ends of the belt-shaped material 11.

If the width of the adhesive tape 6A is too small, it is not possible to join sufficiently both ends of the belt-shaped material 11, and it also becomes difficult to handle the adhesive tape 6A. Therefore, the width needs to be 3 mm or above. On the other hand, if the width is too large, it is not desirable because of poor workability at the time of disassembling the cylinder body 3 for branching at a later stage. In other words, in the case of branching the optical-fiber cable 10 at a later stage, for example, the adhesive tape 6A is peeled off from the cylinder body 3, the joint of both ends 3a of the belt-shaped material 11 is opened, and the optical-fiber ribbons 1 are taken out from this opening. If the width of the adhesive tape 6A is so large that one half or more portion of the periphery of the cylinder body 3 is covered by the adhesive tape 6A, it becomes difficult to peel off the adhesive tape 6A from the cylinder body 3. This requires too much cumbersome work. Therefore, it is preferable that the width of the adhesive tape 6A is less than one half of the outer periphery of the cylinder body 3.

Further, the adhesive tape 6A may be equipped with a tensile stress-resistant unit that is not disconnected easily when applied with a tensile stress. In this case, this tape can be utilized as a rip cord for tearing off the sheath 5 at the time of disassembling the sheath 5. For the tensile stress-resistant unit, there may be used, for example, a tensile stress-resistant fiber such as a glass fiber, an aramid fiber, a carbon fiber, or the like. A tape material 6a may also be formed by using a fiber reinforced resin including any one of these fibers. Alternately, a long tensile stress-resistant fiber may be used by being added vertically at a suitable position within the adhesive tape 6A.

The two rip cords 8B are at mutually symmetrical positions with respect to the center or the fiber ribbons 1 of the cable 10B. Further, the two members 2 are mutually at symmetrical positions with respect to the center or the fiber ribbons 1 of the cable 10B. Further, the plane including the two cords 2 and the plane including the two members 8B are at almost right angles with each other. In this case, the term almost right angles means that an angle formed by the two crossing planes is not limited to 90 degrees but is within a range from 45 to 135 degrees. The outer diameter of this cable 10B is, for example, about 10 mm.

For the rip cords 8B, there may be generally used, for example, a high-tensile high-polymer fiber, an aramid fiber, a glass fiber, a metal fiber, a steel wire, a cotton yarn, or a plastic tensile stress-resistant unit as well as the rip cord 8A.

Figure 6:
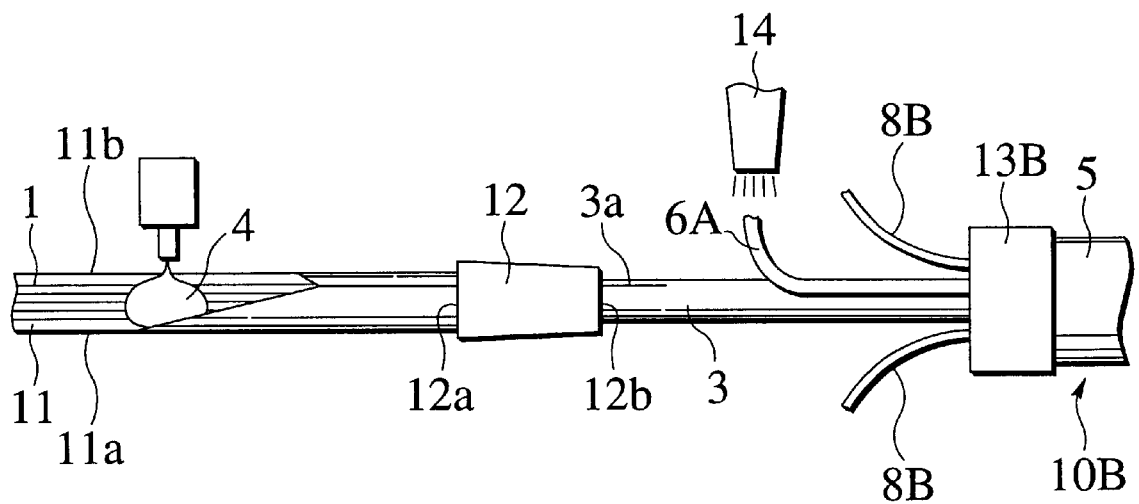
FIG. 6 is an explanatory view for showing a manufacturing process of the optical-fiber cable shown in FIG. 3.

The optical-fiber cable 10B is manufactured as follows, for example. FIG. 6 shows a method of manufacturing the optical-fiber cable of the present invention. The explanation of the manufacturing processes already explained in the first embodiment will be omitted.

The belt-shaped material 11 and the optical-fiber ribbons 1 are guided into a former 12.

The belt-shaped material 11 is bent to surround the fiber ribbons 1 while passing through the former 12, and both edges (ends) 3a of the belt-shaped material 11 are faced together, to form a cylinder main body 3. The cylinder body comes out from the former 12.

After that, the adhesive tape 6A is heated by heating means 14 such as a hot jet or the like, to melt the adhesive layer 6b thereof. The adhesive tape 6A is laminated on a joint part A2 of the cylinder body 3, and then both edges 3a of the belt-shaped material 11 are joined.

Subsequently, in a state that the rip cords 8B and two tension members not shown are set along the cylinder body 3 adhered with the adhesive tape 6A, they are guided together into an extrusion molder 13B. By passing these members through the extrusion molder 13B, a sheath 5 is formed to collectively cover the cylinder body 3, the rip cords 8B and the tension members with the resin, thereby to obtain the optical-fiber cable 10B.

For the molder 13B, there may be used a molder equipped with a dice and a nipple.

Figure 7:
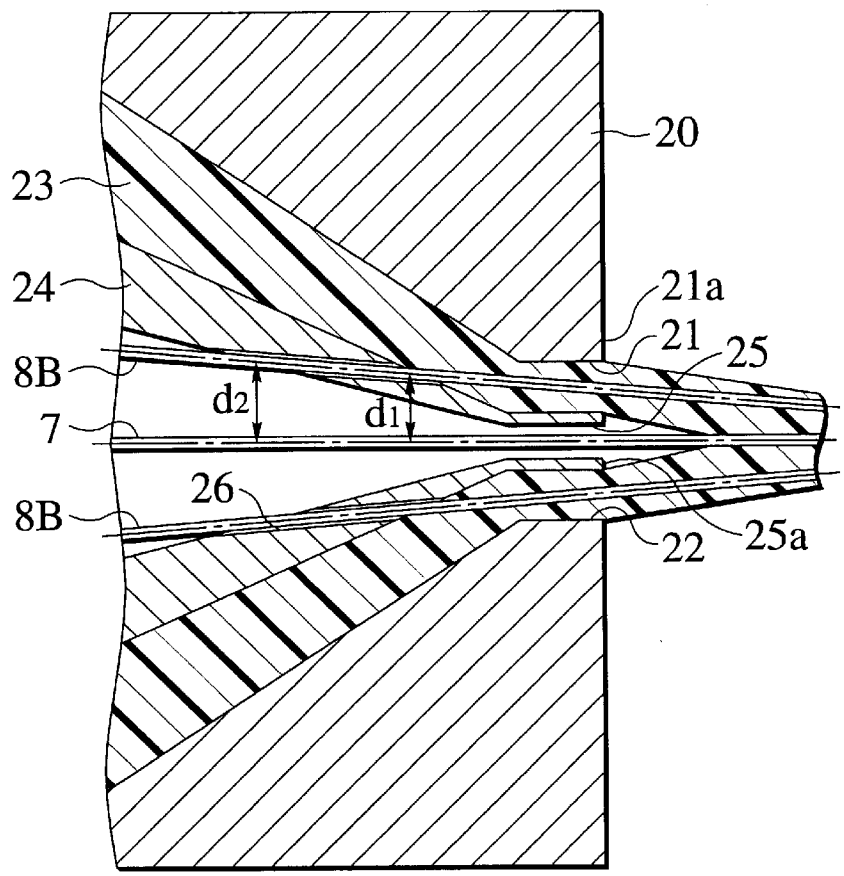
FIG. 7 is a cross sectional view of an extrusion molder shown in FIG. 6.

FIG. 7 is a cross sectional view of a front end part of a dice and a nipple, for showing one example of the molder 13 used in the present embodiment. A nipple 24 is provided within a dice 20. Between the dice 20 and the nipple 24, there is supplied a resin 23 in a melted state for being used to form the sheath 5. At the exit side of the dice 20, a dice hole 21 is provided, and a nipple hole 25 is provided at the front end of the nipple 24. The front end of the hole 21 and the front end of the hole 25 are on the same plane, and the hole 21 and the hole 25 are disposed concentrically.

On the wall surface of the nipple 24, two rip cord through-holes 26 are provided for passing the rip cords 8B to the hole 21. Similarly, on the wall surface of the nipple 24, two tension-member through-holes not shown are formed for guiding the tension members 2 to between the holes 21 and the hole 25.

The center lines of the two through-holes 26 and the center lines of the two tension-member through-holes are respectively disposed at mutually symmetrical positions with respect to the center line of the hole 25. Further, the plane including the center lines of the two through-holes 26 and the plane including the center lines of the two tension-member through-holes are mutually in almost right angle positional relationship. The term almost right angle means that an angle formed by the two crossing planes is not limited to 90 degrees but is within a range from 45 to 135 degrees.

Further, there is a characteristic that, in the molder 13B, the center lines of the through-holes 26 of the rip cords 8B and the center lines of the tension-member through-holes are not in parallel respectively with the center line of the hole 25. In other words, the through-holes 26 are provided such that a distance d2 between the center line of the through-hole 26 and the center line of the hole 25 at an inner position of the nipple 24 is larger than a distance d1 between the center line of the through-hole 26 and the center line of the hole 25 at the hole 25 side. Similarly, the through-holes of the tension members not shown are also provided such that a distance between the center line of the tension-member through-hole and the center line of the hole 25 at an inner position of the nipple 24 is larger than a distance between the center line of the tension-member through-hole and the center line of the hole 25 at the hole 25 side.

An angle formed by the center line of the through-hole 26 and the center line of the hole 25 and an angle formed by the center line of the tension-member through-hole and the center line of the hole 25 are set respectively such that the rip cord 8B and the tension member 2 drawn out from the hole 21 gradually come close to a cable core 7 as they are away from the dice 20, and the rip cord 8B and the tension member 2 adhere to the core 7 before the resin around the dice 20 is hardened. Then, the respective angles thereafter are set according to the thickness of the core 7, the properties of the resin, the running speed, etc. so that the rip cord 8B, the tension member 2 and the core 7 run in parallel.

In this molder 13B, after the rip cord 8B and the tension member 2 have respectively passed through the through-hole 26 and the tension-member through hole, they pass through a melted resin 23 and run by gradually reducing the distance from the core 7. When the resin 23 around the rip cord 8B and the tension member 2 adheres to the core 7, the rip cord 8B, the tension member 2 and the core 7 become parallel with each other. The resin 23 is then hardened to form the sheath 5.

As explained above, when the molder 13B, in which the through-holes 26 and the tension-member through-holes are formed in a slope with respect to the center line of the hole 25, is used, the resin can be guided onto the core 7 to have a close adhesion even if the resin 23 gives a strong adhesive operation to the tension members 2 and the rip cords 8B within the molder 13B. Accordingly, it is possible to prevent a generation of a gap between the sheath 5 formed and the core 7. Particularly, in the vicinity of the rip cords 8B and the tension members 2, a generation of a gap can be prevented securely.

Further, it is also possible to prevent securely a generation of a gap between the core 7 and the sheath 5 at a portion other than the vicinity of the rip cords 8B and the tension members 2 by applying a vacuum pressure to the space around the cable drawn from the dice hole 25.

Figure 8:
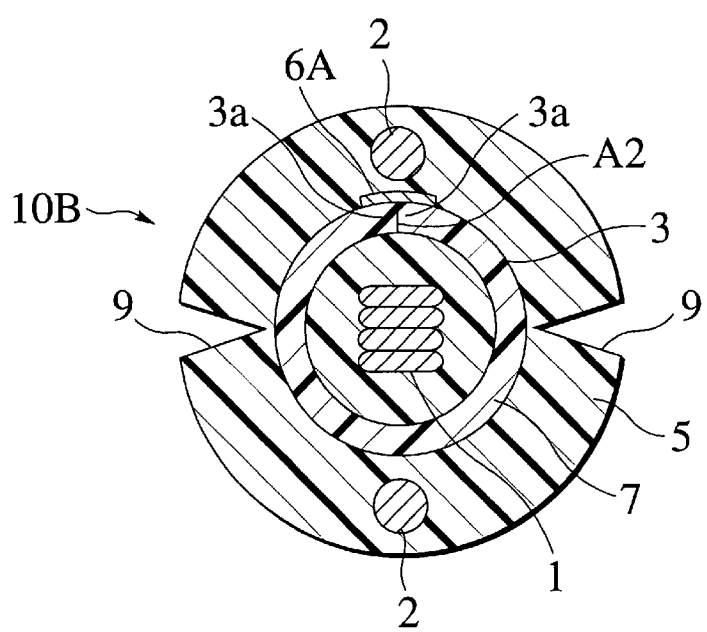
FIG. 8 is an explanatory view for showing a method of taking out an optical-fiber ribbon from the optical-fiber cable shown in FIG. 3.

FIG. 8 shows one example of a method of taking out the optical-fiber ribbons 1 from the optical-fiber cable 10 according to the present invention.

Two rip cords 8B embedded within a sheath 5 are drawn out, and the sheath 5 is torn up to form two grooves 9 on the sheath. With these two grooves 9 as borders, the sheath 5 is further torn up in up and down directions. Then, a tape 6A is peeled off from a cylinder body 3, and both ends 3a of the cylinder body 3 are opened in directions to separate from each other. Thus, the fiber ribbons 1 are taken out.

Since the rip cords 8B are embedded within the sheath 5 and further both ends 3a of the cylinder body 3 are adhered by the adhesive tape 6, the fiber ribbons 1 can be taken out easily without disconnecting the optical-fiber 10B.

According to the above embodiment, it is easy to manufacture the optical-fiber as the cylinder body 3 is prepared by joining both ends 3a of the belt-shaped material 11 with the adhesive tape 6A. Particularly, if the adhesive tape 6A has adhesive strength on its both surfaces, a satisfactory adhesion can be obtained between the cylinder body 3 and the adhesive tape 6A and between the adhesive tape 6A and the sheath 5, by thermal fusion. Therefore, the joint between both ends 3a of the belt-shaped material 11 can be carried out easily and securely. Further, as the adhesive tape 6A is used for joining both ends 3a of the cylinder body 3, the cylinder body 3 can be disassembled easily by peeling off the adhesive tape 6A from the cylinder body 3 in case of the branching at a later stage. Thus, the fiber ribbons 1 can be taken out easily from the inside of the cylinder 3.

Further, if the adhesive tape 6A used has a tensile stress-resistant unit, this adhesive tape 6A can be used as a rip cord for tearing up the sheath 5.

The optical-fiber cable 10B has rip cords 8B embedded in the sheath 5. Thus, the optical-fiber ribbons 1 are taken out without braking the cable 10B, and it is easy to connect and branch at a later stage with a cable. The rip cords 8B is provided without preventing the sheath 5 and the cable core 7 from adhering, when the cable 10B is bent the cylinder body 3 does not yield, and the optical-fiber ribbons 1 in the cylinder 3 is not bent. Therefore, an excellent cable which has little transmission loss is obtained.

In the optical-fiber cable 10B, the rip cord 8B has a glass fiber, a metal fiber, a cotton yarn, or a plastic tensile stress-resistant unit, and sheath 5 is tore up easily.

Figure 9:
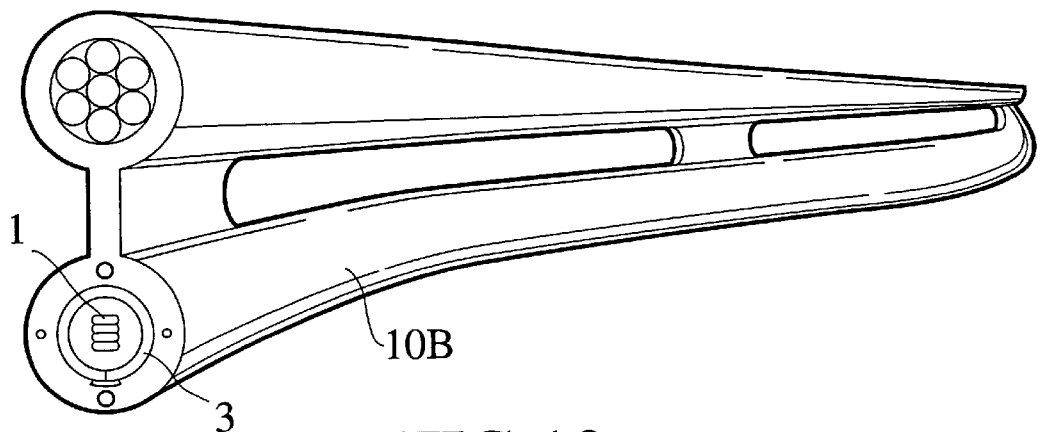
FIG. 9 is a perspective view for showing an example that the optical-fiber cable shown in FIG. 3 is applied to a self-support type cable.

Although the cylinder body 3 is disposed at the center in the present embodiment, the present invention is not limited to this structure. The invention can also be applied to optical-fiber cables of various types of structures such as, for example, an SSD type cable (self-supportive type cable) equipped with a cylinder body 3 accommodating optical-fiber ribbons 1 and a tensile stress unit 30, as shown in FIG. 9.

Third Embodiment

Figure 10:
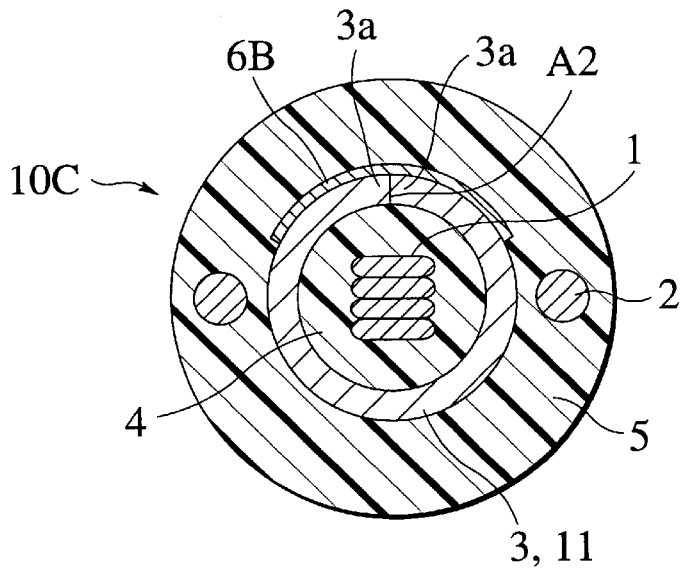
FIG. 10 is a cross sectional view of an optical-fiber cable relating to a third embodiment of the present invention.

As shown in FIG. 10, an optical-fiber 10C relating to the present embodiment is structured such that there is disposed at the center a cylinder body 3 accommodating optical-fiber ribbons 1, and the outer periphery of the cylinder body 3 is covered by a sheath 5, with tension members 2 being provided within the sheath 5. The cable 10C has an outer diameter of about 10 mm.

The cylinder body 3 is formed by joining both ends 3a of a belt-shaped material 11 in a width direction with an adhesive tape 6B to form a cylinder shape. In the present embodiment, the outer circumference of the cylinder body 3 has a size of 15 mm, and the adhesive tape 6B is set to have a width of about 5 mm, with the same structure as that of the adhesive tape 6A shown in FIG. 5.

The outer periphery of the cylinder body 3 is covered by the sheath 5, and two tension members 2 are embedded inside the sheath 5 along a longitudinal direction of the cylinder body 3. There may also be disposed rip cords (not shown) between the cylinder 3 and the sheath 5 along a longitudinal direction when necessary. However, if the adhesive tape 6B has a tensile stress-resistant unit as described above, the provision of the rip cords is not necessary.

Figure 11:
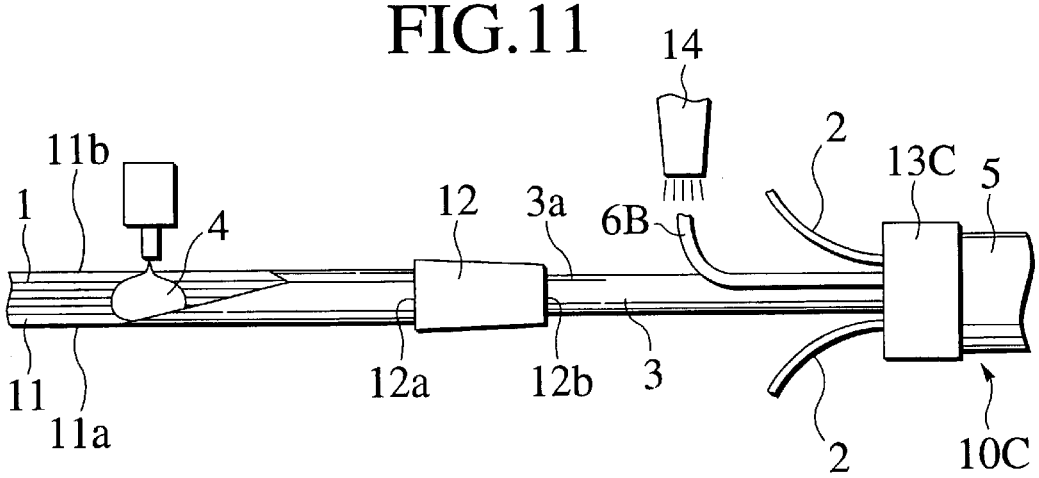
FIG. 11 is an explanatory view for showing a manufacturing process of the optical-fiber cable shown in FIG. 9.

The cable 10C is manufactured as shown in FIG. 11.

In a state that the two tension members 2 are set along the cylinder body 3 adhered with the adhesive tape 6B, they are guided into an extruding molder 13C. While passing through the molder 13C, the cylinder body 3 and the tension members 2 are collectively covered by the resin, to form the sheath 5. Thus, the optical-fiber cable 10C is obtained. The molder 13C used is the same as that shown in FIG. 7, and only tension-member through-holes are used.

What is claimed is:

1. An optical-fiber cable, comprising:

an optical-fiber; and a belt-shaped member made of resin and formed in a tubular shape, the belt-shaped member having a first end and a second end joined to each other, the belt-shaped member accommodating the optical-fiber therein.

2. An optical-fiber cable according to claim 1, further comprising:

a first tension member disposed at an outside of the belt-shaped member; and a sheath covering the outside of the belt-shaped member and the tension member.

3. An optical-fiber cable according to claim 2, further comprising:

a first rip cord disposed at the outside of the belt-shaped member within the sheath.

4. An optical-fiber cable according to claim 3, further comprising:

a second rip cord; and a second tension member, wherein said first rip cord and said second rip cord are symmetric with respect to said optical-fiber, said first tension member and said second tension member are symmetric with respect to said optical-fiber, a first plane including said first rip cord and said second rip cord and a second plane including said first tension member and said second tension member cross each other.

5. An optical-fiber cable according to claim 3, wherein said rip cord has one of a high-tensile high-polymer fiber, a glass fiber, a cotton yarn and a metal wire.

6. An optical-fiber cable according to claim 1, comprising:

an adhesive member adhered to said first end and said second end of said belt-shaped member.

7. An optical-fiber cable according to claim 6, wherein said adhesive member has a tension member therein.

8. An optical-fiber cable according to claim 1, further comprising:

a filler disposed with a distance along the optical-fiber in a longitudinal direction thereof, the filler being provided between the optical-fiber and the belt-shaped member for preventing a move of the optical-fiber in a longitudinal direction.

9. A method of manufacturing an optical-fiber cable, comprising the steps of:

forming a belt-shaped member in a tubular shape while enclosing an optical-fiber with the belt-shaped member;

joining a first end and a second end of the belt-shaped member to each other;

disposing a tension member at an outside of the belt-shaped member; and covering the outside of the belt-shaped member and the tension member with a sheath.

10. A method of manufacturing an optical-fiber cable according to claim 9, wherein before forming said belt-shaped member into said tubular shape, said belt-shaped member is disposed along said optical-fiber, and a filler is applied with a distance along to one of said belt-shaped member and said optical-fiber in a longitudinal direction.

* * * * *